A. SMITH.
ELECTRIC ARC WELDING.
APPLICATION FILED AUG. 17, 1914.

1,298,590.

Patented Mar. 25, 1919.
5 SHEETS—SHEET 1.

A. SMITH.
ELECTRIC ARC WELDING.
APPLICATION FILED AUG. 17, 1914.

1,298,590.

Patented Mar. 25, 1919.
5 SHEETS—SHEET 3.

Witnesses
H. S. Trogner
R. Hartig

Inventor
Andrew Smith

By
Eugene C. Brown
Attorney

UNITED STATES PATENT OFFICE.

ANDREW SMITH, OF SAN MATEO, CALIFORNIA, ASSIGNOR TO SMITH METAL PERFORATING COMPANY, OF SAN MATEO, CALIFORNIA.

ELECTRIC-ARC WELDING.

1,298,590.         Specification of Letters Patent.         Patented Mar. 25, 1919.

Application filed August 17, 1914. Serial No. 857,227.

*To all whom it may concern:*

Be it known that I, ANDREW SMITH, a citizen of the United States, residing at San Mateo, in the county of San Mateo and State of California, have invented certain new and useful Improvements in Electric-Arc Welding, of which the following is a specification.

This invention relates to improvements in methods of electric welding and in apparatus therefor in which the weld is effected by means of the electric arc.

One feature of my present invention consists in a method of welding wherein the weld is produced by a series of steps automatically controlled, the edges of the metal to be united being first brought to a welding temperature, then flushed with molten metal and maintained in proper condition to remove the slag and form a homogeneous weld with the impurities upon the outside, and finally cutting off the superfluous metal containing said impurities, and leaving a smooth unbroken surface.

Another feature consists in the provision of an automatically controlled molten metal supply which is regulated in accordance with the particular conditions demanded by the area of the welded surfaces, the rate of travel of the pipe or other article, the amperage of the current employed to effect the weld, etc. My invention also contemplates a welding torch or tool from which the arc is sprung, which shall be non-consuming, with provision for the circulation of a cooling medium to maintain the torch below the oxidizing temperature.

The electric welding of joints as now practised, is mainly effected by the resistance method in which one terminal of an electrical circuit is connected to the work while the other terminal conducts the current to the joint which is heated to welding temperature by the resistance of the joint, the parts being then united under pressure. This method is essentially carried out at a low voltage (frequently as low as two volts) and a very large amperage. This method is not adapted to the continuous welding of joints in long pipe lengths having thick walls requiring too long a time to properly heat the metal to the fusion point and being wasteful in the expenditure of energy.

More recently the electric arc has been employed in effecting certain kinds of welding, such as the well known Bernardos system in which the joint or cavity between the edges to be welded is filled with steel punchings or pieces of cast iron, the positive terminal being connected to the object to be welded while the operator, with a carbon rod attached to the negative wire, touches the part to be heated and then withdraws it a short distance according to the current strength to establish the arc, and moves the carbon slowly over the surface so as not to effect an extreme local heating until the whole desired part is brought to the proper fusing heat.

In another process of autogenous welding by the electric arc, known as the Slavianoff process, one terminal is attached to the object to be welded and the other terminal is connected to a holder containing a metal rod of the same metal that is to be welded and the operator, after first making contact with this metal rod electrode, withdraws it a short distance to establish an arc. The rod is consumed, the molten metal being transferred to the joint, and the operator manipulating the holder over the joint until the weld is completed. This process is evidently slower than the Bernados process, but is more reliable and less liable to form hard brittle welds, but requires greater skill in maintaining the correct arc, as the welding rod has a tendency to stick if in too close contact while if the rod is too far away the arc ceases.

The use of the electric arc in repairing cracked or broken parts and for filling cavities in defective castings is now well known. The metal parts to be united are heated by an arc from a carbon or graphite electrode, usually manipulated by one hand of the operator, while with the other hand he brings a metal filler rod into proximity to the arc so that it is fixed and carried thereby into welding union with the parts of the joint.

In all prior methods of arc welding, in so far as I am aware the degree of success attained depends very largely upon the skill of the operator and consequently the results are not uniform. The condition known as the "welding state" of iron or steel is one which exists only within a very limited range of temperature. The parts to be united are heated within the critical range of temperature, in which the molecules approach, though never arriving at liquidity, and which condition is favorable to the interpenetration of the molecules and consequent weld-union of the surfaces. When additional metal is added or filled in, as in the processes above described, it is necessary that the adjacent edges of the joint to be weld-united should be brought to the welding temperature by the heat of the arc in order to effect a proper union and yet not become overheated or burnt, and in this lies the great difficulty in the manually controlled arc welding.

When the electrode from which the arc proceeds is of carbon, the weld becomes unduly hard and brittle because of the additional carbon content absorbed from the carbon dioxid of the consumed electrode. The heat of the arc is also too intense from a carbon electrode which increases the liability to oxidize or "burn" the metal adjacent the weld.

My invention overcomes the several difficulties involved in electric welding by the processes referred to above, by providing a non-consuming metal electrode which is maintained below an oxidizing temperature. The edges of the metal adjacent the weld may therefore be brought to the proper welding temperature and in exactly the proper state to combine with the particles of molten filling metal proceeding in a fine stream of minute fused globules from the arc of the separate metal electrode, which is being melted and deposited on the work. By maintaining an arc separate from the arc of the welding or consuming metal electrode, I can regulate the current flowing therethrough in proportion to the conditions of the work, while a heating arc from the non-consuming electrode can be regulated to bring the sides of the joint to be welded to the exact critical welding state of fusion and this condition results in a homogeneous weld.

For the purpose of more fully disclosing my invention I shall refer in the further description to the accompanying drawings, in which Fig. 15 is a side elevation, partly in section, of one form of my water-cooled welding torch for manual use; Fig. 16 is a longitudinal fragmentary section of another form of my portable water-cooled torch; Fig. 17, is a side elevation of my automatically controlled arc-welding torch; Fig. 18, is a detail view of a portion of the same, partly in section, showing the manner of connecting the water-cooling pipes; Fig. 19 is a top plan view of the torch shown in Fig. 17; Fig. 20 is a side elevation and Fig. 21, a section on the line 21—21 of Fig. 20, showing a modified form of my torch.

Figure 1:
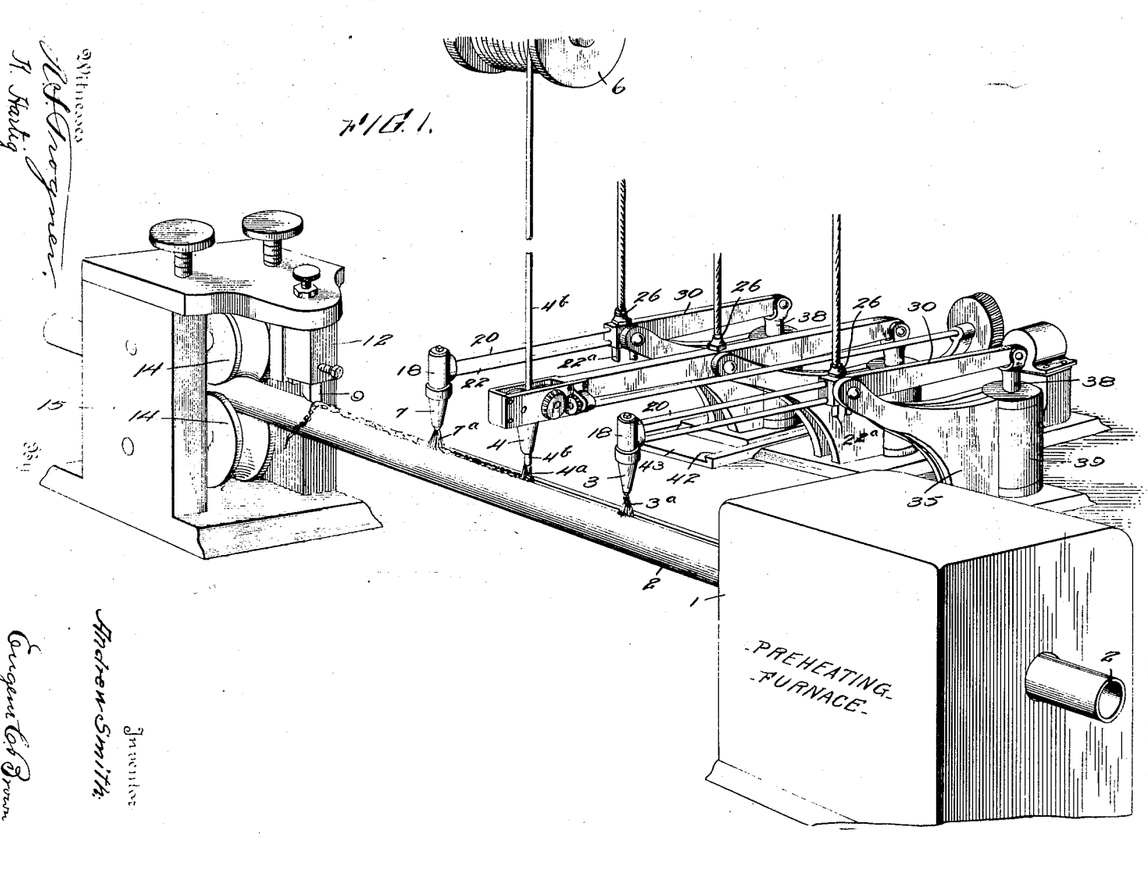
—Figure 1 is a perspective view of a welding apparatus embodying my invention and disclosing the several steps which constitute my improved method of arc welding.
Figure 2:
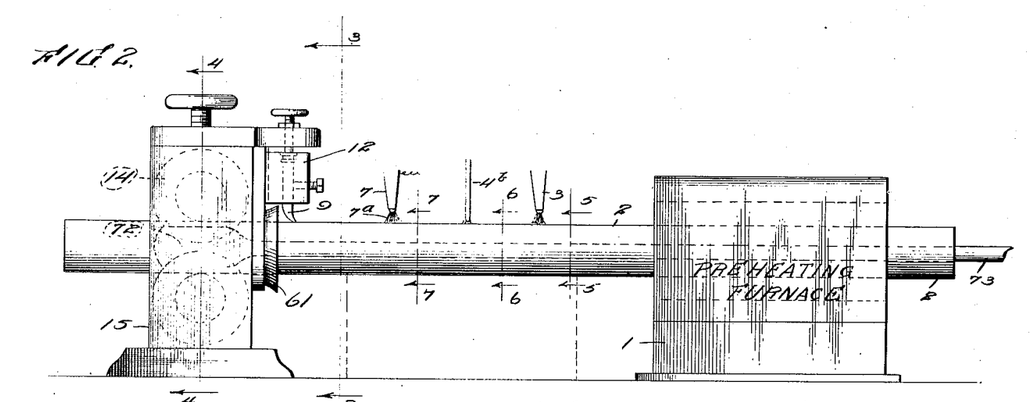
Fig. 2 is a side elevation of a similar apparatus, showing also a shaping bell in connection with the stand of rolls.
Figure 3:
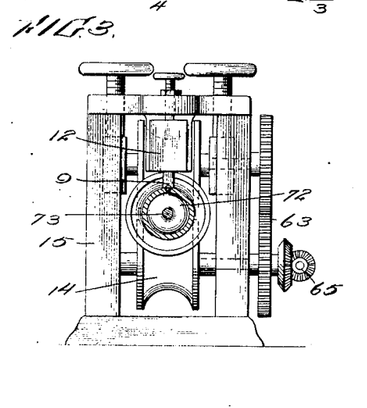
Figs. 3 and 4 are vertical sections on the lines 3—3 and 4—4, respectively of Fig. 2.
Figures 4, 5, 6, 7:
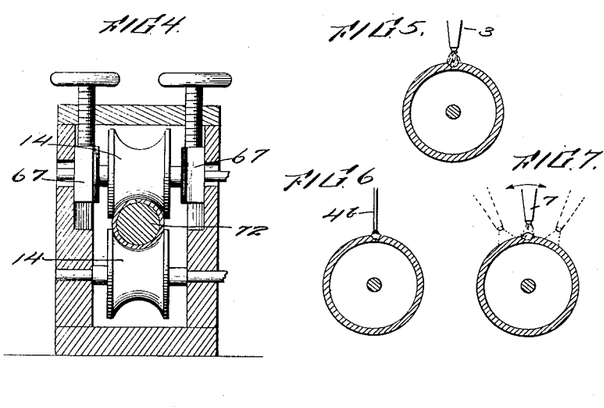
Figs. 5, 6 and 7 are cross sectional views on the lines 5—5, 6—6, and 7—7 of Fig. 2.

I have illustrated in Fig. 1, the general arrangement of apparatus employed in carrying out my method of arc-welding, as applied to the welding of joints in the manufacture of welded pipe. Inasmuch as the weld-union is homogeneous, the finished pipe is practically seamless. I have found it advisable to preheat the pipe to about a red heat as this not only conserves the energy of the electric arc but lessens the liability to internal strains upon cooling by making the gradations of heat more uniform. After leaving the preheating furnace 1 the pipe 2, which is connected to one terminal of the electric circuit is fed under the electric arc $3^a$ springing from the fluid-cooled metal torch 3, which heats the edges of the seam or joint to the point of fusion or welding temperature. In order to produce a successful weld it is absolutely essential that the entire area of the surfaces to be welded should be in a state of fusion.

Figure 8:
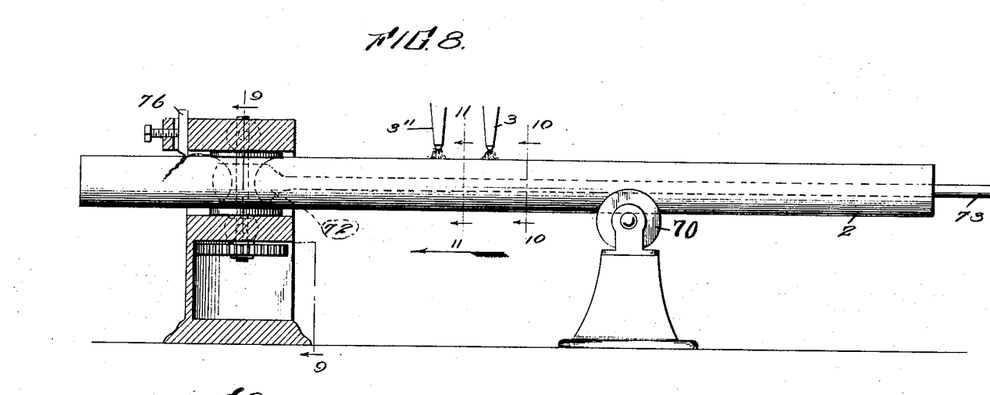
Fig. 8 is a side elevation, partly in section, showing another form of my process of welding in which I dispense with the consuming metal filling electrode and unite the arc-fused edges of the joint by compression in passing through the rolls, and then cut off the extruded metal which contains the slag.
Figure 9:
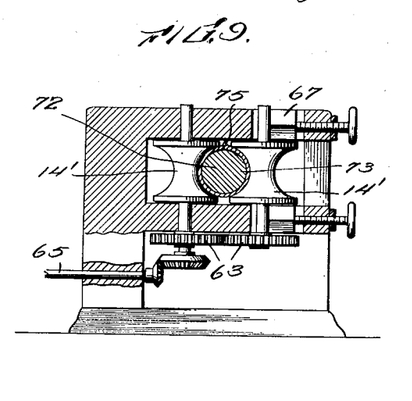
Figs. 9, 10 and 11 are vertical sections on the lines 9—9, 10—10, and 11—11, respectively of Fig. 8.
Figure 10:
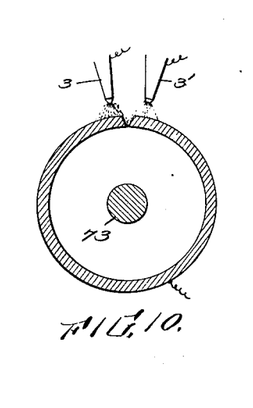
Figure 11:
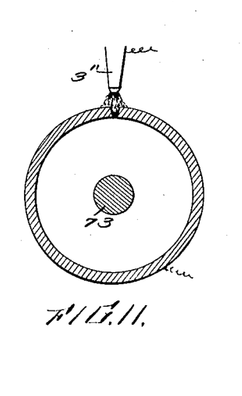

In this condition, the pipe passes under the arc $4^a$ issuing from the metal filling electrode $4^b$, which is carried by the welding tool 4, the rod electrode being automatically fed from the reel 6. Under the action of this arc, the minute fused globules of metal are deposited upon the opposite sides and the bottom of the joint until the gap is completely filled and preferably with an added amount of metal projecting above the joint. By reason of the fused condition of the sides of the joint there will be an interpenetration of the molecules of the filling metal and the molecules of the pipe edges, thereby effecting a complete homogeneous weld-union of the metal of the joint. The metal is maintained in a state of fusion as it passes under the influence of the arc 7ª issuing from the fluid-cooled electrode 7. This has the effect of causing the slag with the impurities to appear in the surface layer which is removed as the pipe passes under the cutting tool 9, adjustably held in the carrier 12. The finished pipe is accurately traced or straightened as it passes through the rolls 14 in the stand 15. In operating upon pipes of large diameters, an inner mandrel is employed in the manner indicated in Fig. 8.

Figures 15, 16, 17, 18, 19, 20, 21:
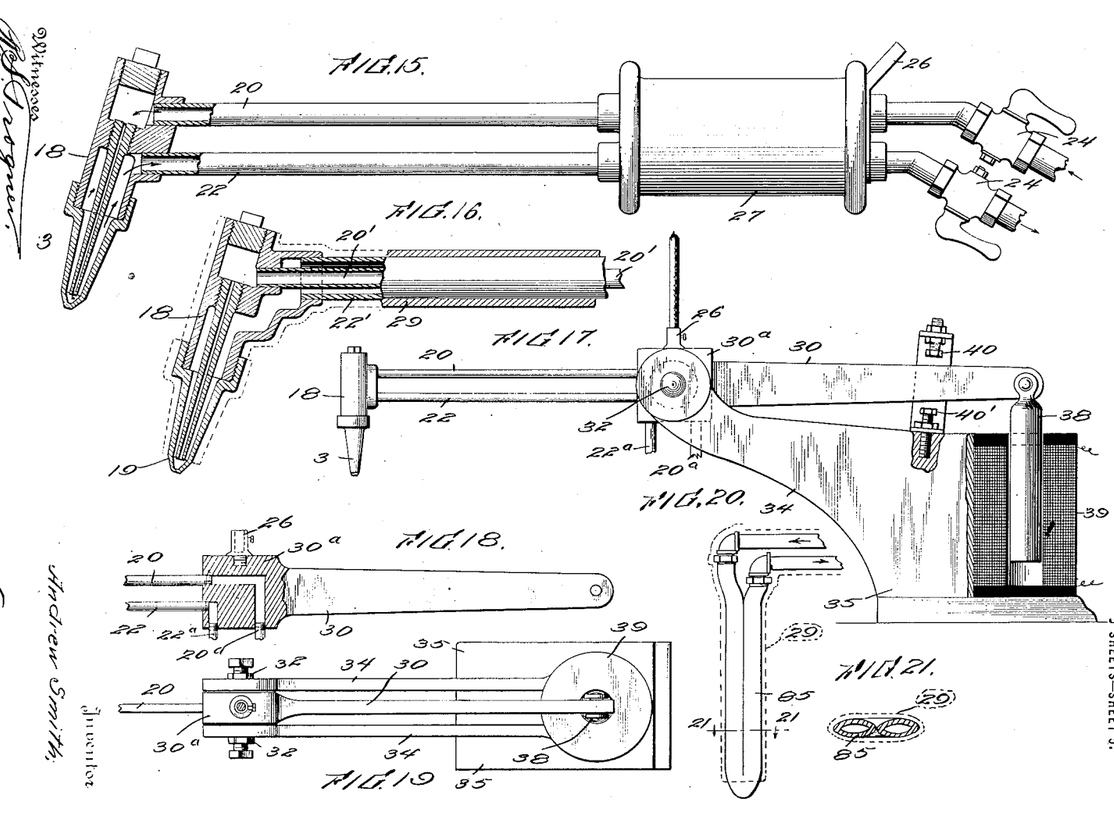

The manner of fluid-cooling the welding torch is shown in Figs. 15 and 16, in connection with a portable or hand torch. The head piece 18, having the hollow electrode 3, removably secured thereto, is provided with channels permitting a constant circulation of the cooling fluid passing inwardly through the pipe 20 and returning through the pipe 22, each of which is provided with a suitable valve 24. The electric circuit terminal 26, is connected to the pipes 20 and 22, which carry an insulated hand grip 27.

In Fig. 16, I have shown the cooling pipes, 20′ and 22′ one within the other. The entire torch may be incased in an insulating protective covering as indicated at 29. This protective covering serves not only to insulate the torch from any object with which it may come in contact, but serves also to protect the metal walls of the torch from the heat radiated from the metal parts under the arc which are at a welding temperature. The insulating sheath thus prevents the propagation of heat from the exterior to the interior of the torch and hence conserves the heat dissipating action of the water flowing through the channels of the torch.

In Figs. 17, 18 and 19, I have illustrated the form of automatically controlled torch indicated at 3 and 7 in Fig. 1. The cooling pipes 20 and 22 which convey the water to the torch head 18, are secured to the pivot block 30ª of a lever 30, the block having trunnions pivoted at 32, in the yoke arms 34 of the base or standard 35. The connections of the fluid-cooling pipes may be made, as indicated, through channels in the pivot block with the supply and outlet pipes 20ª and 22ª.

The end of the lever 30 carries a pivoted core 38, which is in operative relation with the solenoid coil 39, preferably connected in circuit with the torch 3. In operation the torch head 18, normally overbalances the core 38, coming into contact with the pipe 2, and thereby establishing the circuit through the torch and the solenoid coil. The core is immediately drawn down into the coil, lifting the end of the torch 3 from the pipe and thereby establishing an arc, and this is maintained by the continued pull of the solenoid. In case of any interruption to the current, the arc is interrupted, de-energizing the solenoid and permitting the torch to drop back into contact with the pipe. Upon the reëstablishment of the current, the arc will again be automatically started in the manner described. Adjustable limit stops 40, 40′ may be provided.

Figures 14, 22, 23:
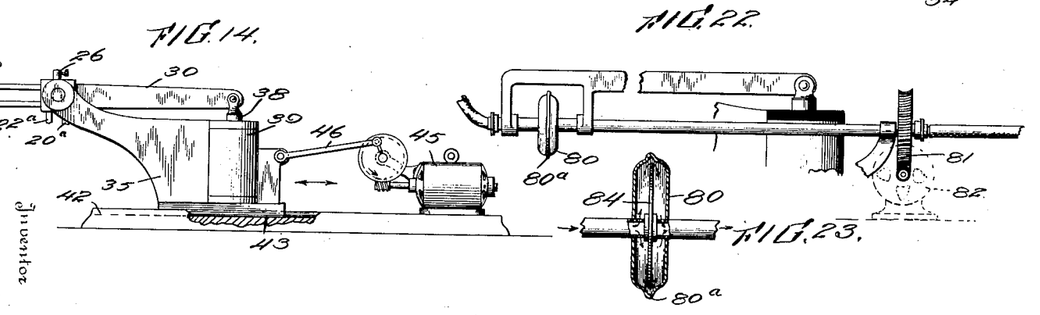
Fig. 14 is a side elevation of mechanism for controlling the arc and oscillating the torch when it is desired to move the arc from side to side across the weld.
Fig. 22 is a side elevation of another form of my automatically controlled water-cooled torch, having a rotary tool.
Fig. 23, is an enlarged sectional view of the rotary tool shown in Fig. 22.

As it is desirable to oscillate the torch 7, so that the arc 7ª will shift from one side to the other across the joint to distribute the heat over the weld, I have shown in Figs. 1 and 14, the base 35, adapted to slide between guideways 42, on the foundation plate 43. The base may be oscillated by means of an electric motor 45, and connecting link 46, or in any other suitable manner.

Figures 12, 13:
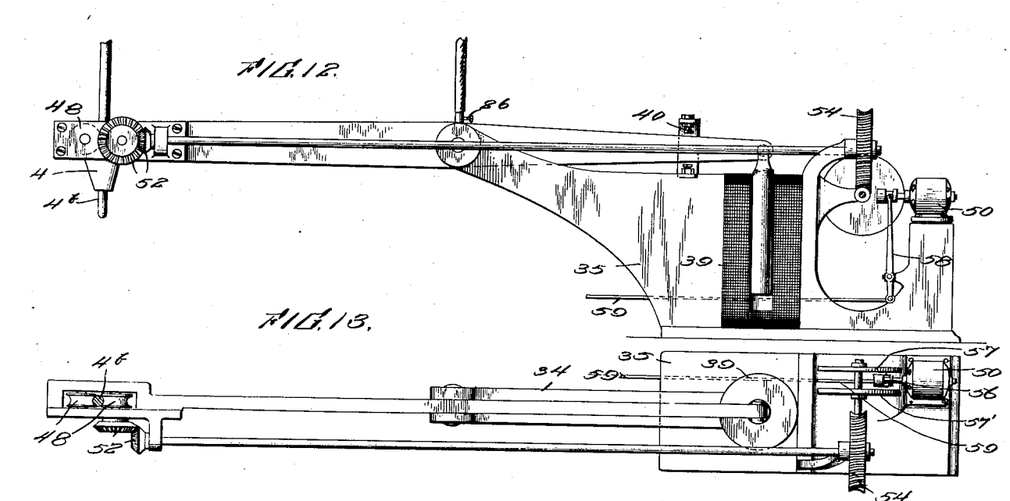
Figs. 12 and 13, are side elevation and top plan views respectively of one form of apparatus for controlling the metal filling electrode, with means for automatically feeding the metal rod.

The current amperage flowing through the arc 4ª which springs from the fusible metal electrode 4ᵇ, and projects a stream of minute fused globules of metal into the joint, may be regulated to suit the conditions required by the work. The regulation of this current is independent of the current supplying the heating arc 3ª. It is desirable that the supply of fused globules of molten metal issuing from the metal electrode 4ᵇ, (Figs. 1, 12 and 13), should be proportioned to the area of the joint and to the speed with which the pipe 2, is fed through the apparatus and I therefore provide mechanism for automatically feeding the metal rod 4ᵇ through the torch 4. As one means of accomplishing this purpose, I have shown the rod 4ᵇ passing between feed-rollers 48, operatively connected with the motor 50, through gears 52, 54 and a speed changing clutch; the latter comprising a friction roller 56, on the motor shaft which may be shifted laterally to engage either disk 57 or 57′ for reversing the direction of rotation and moved longitudinally on the motor shaft to engage the clutch disks at different radial distances to vary the speed. These changes in the clutch mechanism are effected through the lever 58 and controlling rod 59.

In Figs. 2 to 7 inclusive, I have shown an arrangement for carrying out my method of arc welding in a manner similar to that illustrated in Fig. 1, so that the method of operation will be understood without further detailed explanation. A shaping bell 61, is employed in connection with the rolls 14. The rolls are connected by gearing 63, with a power-driven shaft 65, and the upper roll is carried in bearing blocks 67, which may be adjusted vertically to accommodate pipes of varying diameters.

In Figs. 8 to 11 inclusive, I have shown a modification of my method of arc welding in which I dispense with the metal filling electrode and may also dispense with the preheating furnace. The pipe 2 is fed over a roll 70, and beneath a pair of non-consuming fluid-cooled torches 3, 3', located upon opposite sides of the joint so that the arcs may bring the metal adjacent the joint nearly to the welding temperature. Immediately after passing from the preheating arcs of the torches 3, 3', the pipe passes under the torch 3'', so that its arc will raise the entire surface area of the joint to the point of fusion. While in this state, the pipe is drawn over the mandrel 72 on the end of the rod 73, and compressed between the rolls 14' which completely weld the fused sides of the joint and extrude a portion of the metal, together with any slag and impurities into a fin or protuberance 75 which is cut off by the tool 76.

Instead of the fixed electrode attached to the stationary head 18, it is sometimes desirable to employ a rotary electrode 80, such as I have illustrated in Figs. 22 and 23, which may be constantly rotated by gearing 81, driven by a motor 82. The casing of the electrode may be connected to fluid inlet and outlet pipes and have an interior diaphragm 84, to cause a complete circulation of the cooling fluid therethrough. The arc springs from the intermediate peripheral rib 80ª, and is caused to constantly travel around the perimeter by the rotation.

My fluid cooled torch may be advantageously employed where the arc is used to cut away metal parts. In Figs. 20 and 21, I have shown a form of torch which is made by doubling a tube 85, of elliptical section upon itself, thereby forming a very narrow tool which can enter contracted spaces or cut narrow grooves or channels in metal objects. Such an implement is exceedingly useful in cutting away unnecessary parts, such as the risers from steel castings.

While water-cooled electrodes have been used in resistance welding where the tool is in contact with the work and the heat is generated by the resistance offered by the joint to the passage of the current; and also as electrodes in certain types of electric furnaces, I am the first to devise a method of arc welding wherein the joint to be welded is heated by an arc issuing from a fluid-cooled electrode and this results in a better control of the heat, which is less intense than from a carbon electrode and the electrode is non-consuming, being maintained by the cooling-fluid below the oxidizing temperature.

My method of welding by means of an arc springing from an electrode which is maintained in non-consuming condition, not only maintains the integrity of the electrode but also maintains the integrity or purity of the metal of the joints, since the arc does not carry any foreign substances over into the joint.

The method of arc welding is also new with my invention wherein the surfaces of the joint are first heated to a welding or nearly welding temperature by a suitable torch, followed by a metal bearing arc issuing from a metal rod which deposits a stream of fused metal globules upon the preheated surfaces and simultaneously subjects said joint surfaces to the fusing heat of the arc, thereby forming a homogeneous weld.

I have described in detail the particular apparatus illustrated in the accompanying drawings for the purpose of disclosing my method of welding and apparatus therefor, but I am aware that many and varied changes may be made therein within the scope of my claims and without departing from the spirit of my invention.

I claim:

1. The method of welding metal joints which comprises heating the metal upon opposite sides of the joint to a welding temperature by an electric arc, and maintaining the integrity of the metal of the joint and of the electrode from which the arc springs by subjecting the latter to the action of a fluid cooling medium.

2. The method of forming welded metal joints which comprises locally heating the metal upon opposite sides of the joint to a welding temperature, causing an interpenetration of the fused molecules of the metal of the joint under the action of an electric arc, maintaining the integrity of the metal of the joint and of the electrode from which the arc springs by subjecting the latter to the action of a fluid cooling medium, and removing the surface layer of the joint containing the slag and impurities.

3. The method of welding metal joints which comprises heating the article containing the joint to be welded to substantially a red heat, heating the metal parts to be welded approximately to the point of fusion in an electric arc, maintaining the integrity of the metal of the joint and of the electrode from which the arc springs by subjecting the latter to the action of the fluid cooling medium, and subjecting said heated joint portions to the action of an arc carrying fused globules of the same metal as the joint.

4. The method of welding metal joints which comprises heating the article containing the joint to be welded to substantially a red heat, heating the metal parts to be welded approximately to the point of fusion in an electric arc, maintaining the integrity of the metal of the joint and of the electrode from which the arc springs by subjecting the latter to the action of the fluid cooling medium, subjecting said heated joint portions to the action of an arc carrying fused globules of the same metal as the joint, and exposing the resultant weld to the action of an arc from a non-consuming electrode.

5. The method of electric welding which comprises establishing an arc between the parts to be welded and a non-consuming electrode, and heating said parts to approximately the point of fusion, and establishing an arc between said heated parts and an electrode of substantially the same metal as said parts, thereby welding the fused metal issuing from the electrode to said parts.

6. The method of electric welding which comprises establishing an arc between the parts to be welded and a metal electrode and heating said parts to approximately the point of fusion, maintaining the integrity of the metal of the joint and of the electrode from which the arc springs by subjecting the latter to the action of a fluid cooling medium, establishing an arc between said heated parts and an electrode of substantially the same metal as said parts, thereby welding the fused metal dropping from the electrode to said parts, and subjecting the resulting welded parts to the action of an arc issuing from a non-consuming electrode to thereby cause the slag and impurities to gather in the surface layer.

7. The method of welding, which comprises heating the metal parts to be welded to the point of fusion under the action of an electric arc, and maintaining the integrity of said metal parts and of the electrode from which said arc issues by subjecting the latter to the action of a fluid cooling medium.

8. The method of welding joints between metal parts, which comprises subjecting the parts to be welded first to the action of an arc issuing from a non-consuming electrode maintained in alinement with the joint, and then to the action of an arc issuing from a non-consuming electrode oscillating across the path of the joint.

9. The method of welding joints between metal parts, which comprises subjecting the parts to be welded first to the action of an arc issuing from a non-consuming electrode maintained in alinement with the joint, and then to the action of an arc issuing from a non-consuming electrode oscillating across the path of the joint, and then subjecting the parts to a rolling operation.

10. Apparatus for welding, comprising a non-consuming fluid-cooled metal electrode, a fusible metal electrode adapted to supply fused metal to the joint, and means for supplying metal to replenish said electrode as it is consumed.

11. Apparatus for welding, comprising a non-consuming fluid-cooled metal electrode, a fusible metal electrode adapted to supply fused metal to the joint, means for supplying metal to replenish said electrode as it is consumed, a second non-consuming fluid-cooled electrode, and means to oscillate the last-named electrode.

12. Apparatus for welding, comprising a non-consuming fluid-cooled metal electrode, a fusible metal electrode adapted to supply fused metal to the joint, means for supplying metal to replenish said electrode as it is consumed, a second non-consuming fluid-cooled electrode, means to oscillate the last-named electrode and means for automatically establishing and maintaining the arcs from said electrodes.

13. Apparatus for welding, comprising a hollow metal electrode, means for circulating a cooling fluid therethrough, a fusible rod or wire constituting a consuming electrode, a holder therefor, means for automatically feeding the rod or wire to the holder as it is fused or melted by the arc issuing from it, and means for varying the rate at which the rod is fed to the holder.

14. In apparatus for electric arc welding, a hollow metal electrode, means for circulating a cooling-fluid therethrough, a pivoted lever carrying said electrode at one end, and a solenoid operatively connected to the opposite end of the lever, said solenoid being connected in circuit with said electrode, whereby when a current flows through the electrode, the work and the solenoid, the electrode will be automatically lifted to establish an arc and will be maintained in raised position.

15. Apparatus for electrically welding joints between metal parts, comprising a non-consuming fluid-cooled electrode, and a fusible metal electrode adapted to supply fused metal to the joint, the arcs springing from said electrodes to said metal parts.

16. Apparatus for subjecting metal to the action of an electric arc, comprising a portable tubing having juxtaposed tubular members forming a tool ovate in section and providing inlet and return channels for the circulation of a cooling medium.

17. Apparatus for electrically welding joints between metal parts, comprising a fusible metal electrode adapted to supply fused metal to the joint when an electric arc is sprung between the electrode and the metal parts, and means controlled by the current in the circuit of said arc for automatically supplying metal to replenish said electrode as it is consumed.

18. Apparatus for subjecting metal to the action of an electric arc, comprising a non-consuming hollow member having inlet and return channels for circulating a cooling medium, and an insulating covering surrounding said member except at the arcing end.

19. Apparatus for electric welding, comprising a non-consuming fluid-cooled metal electrode, and a fusible metal adapted to supply fused metal to the weld under the action of the arc from said electrode.

In testimony whereof I affix my signature in presence of two witnesses.

ANDREW SMITH.

Witnesses:
 EUGENE C. BROWN,
 K. HARTIG.